(No Model.)
M. G. BENTLEY.
VEHICLE SPRING.
No. 364,569.                    Patented June 7, 1887.
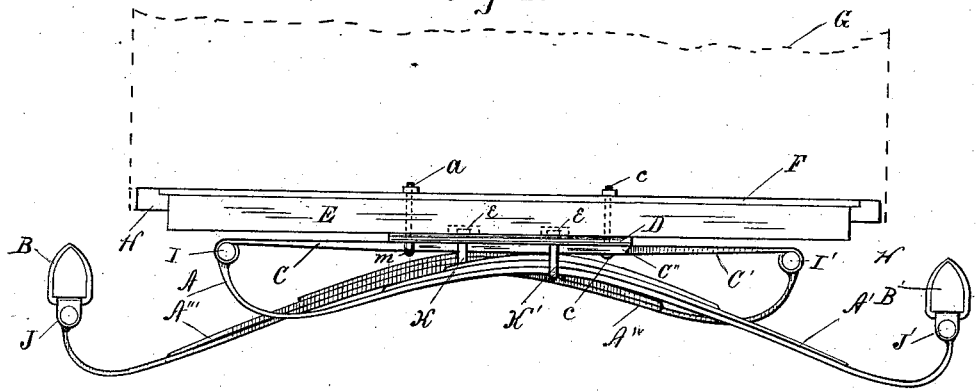
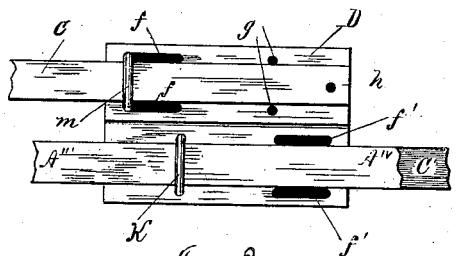
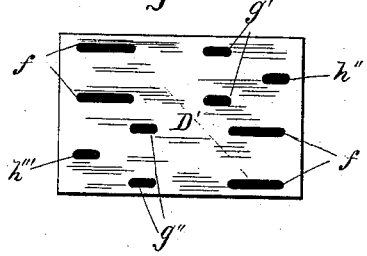
WITNESSES:
G. H. Pattison
L. M. Currier
INVENTOR
Marshall G. Bentley
BY
Wiles & Greene
ATTORNEYS.

UNITED STATES PATENT OFFICE.

MARSHALL G. BENTLEY, OF FREEPORT, ILLINOIS, ASSIGNOR OF ONE-HALF TO JAMES E. SWARTS, OF SAME PLACE.

VEHICLE-SPRING.

SPECIFICATION forming part of Letters Patent No. 364,569, dated June 7, 1887.

Application filed June 8, 1885. Serial No. 168,061. (No model.)

*To all whom it may concern:*

Be it known that I, MARSHALL G. BENTLEY, a resident of Freeport, in the county of Stephenson and State of Illinois, have invented certain new and useful Improvements in Vehicle-Springs; and I do hereby declare the following to be a full, clear, and exact description of the invention, such as will enable others skilled in the art to which it pertains to make and use the same.

My invention relates to improvements in vehicle-springs, and is fully described and explained in the following specification, and shown in the accompanying drawings, in which—

Figure 1 is a front elevation of the spring and attachment embodying my invention; Fig. 2, a bottom plan of the attaching-plates for fastening a pair of springs to a vehicle; Fig 3, a bottom plan of a double plate adapted for fastening two springs to the vehicle.

In these views, G is a vehicle-body; E, a spring-bar fastened transversely to the bottom of the body, and B B' are the side bars which support the body by means of the springs.

C C'' is the upper member, and A A' the lower member, of a compound spring of the form shown in the patent of William J. Moran, No. 280,391, issued July, 3, 1883, the lower member being connected at one end with the upper member by a joint, I, and at the other end with the side bar B' by a shackle, J'.

C' is the upper member, and A''' A$^{iv}$ the lower member, of a duplicate spring connected with the side bar B by a shackle, J. The connection of the two members of each spring and the connection of the lower members with the side bars is precisely the same as that shown in the Moran patent above referred to, and is not claimed as novel in this application.

Above each of the upper members of the two compound springs is a plate, D, of iron or steel, interposed between said upper member and the spring-bar, and forming a rigid bearing-surface therefor. Through one end of the plate is a hole, $h$, corresponding to a hole in the end of the spring beneath it, and through both the plate and the spring passes a bolt, $c$, extending upward through the spring-bar E and the floor of the body G. Between the hole $h$ and the center of the plate D are two holes, $g$, on opposite sides of the spring member C C'', and through these holes pass the legs of a clip, K', which forms the bearing for the lower member, A A', and connects the two members of the spring. The clip is held in place by nuts $e$, countersunk in the lower face of the spring-bar. Near the opposite end of the plate from the hole $h$ are two longitudinal slots, $f$, on opposite sides of the spring member C C'', and through these slots pass the legs of a clip, $m$, which extend upward through the spring-bar E and the floor of the body, and are secured by nuts $a$. The clip $m$ supports the spring member, and the slots provide for adjustment of the clip, so as to vary the leverage of the spring, or, rather, so as to vary the position of the fulcrum on which it rests. It is necessary to support the member C C'' at some point between the center of the body and the knuckle I, and a clip is much better for this purpose than a bolt, since the boring of a bolt-hole through the spring at its point of greatest strain weakens it and renders it very liable to break. Instead of the slots $f$ holes might be made on either side of the spring member; but the slot is preferable as allowing more perfect adjustment of the clip $m$. This adjustment is valuable, since it affords a means of varying the stiffness of the spring, and thus adapts the same spring to use on different sizes or weights of vehicles.

The interposition of the plate D between the spring and the spring-bar has the further purpose of leaving a space between the knuckle I or I' and the spring-bar above it. When the vehicle is in motion, there is constantly more or less vibration of the spring and the end of each spring is likely to rattle against the spring-bar when no space is left between them.

Fig. 3 shows the two plates D combined in a single plate, all the holes being longitudinally slotted to permit adjustment of the springs with reference to each other, and thus provide for the variation of the space between the side bars. I prefer to make the plates separate; but the form shown in Fig. 3 may be used, if found desirable.

Having now described and explained my invention, what I claim as new, and desire to secure by Letters Patent is—

1. The combination, with the body and side bars of a vehicle, of a spring composed of two members, one attached to the body and the other to one of the side bars of the vehicle, and a rigid metal plate between the upper member and the body, and fastened to both said upper member and the body, substantially as shown and described, and for the purpose set forth.

2. The combination of the spring-bar E, the spring composed of the upper member, C C'', and lower member, A A', and the rigid plate D, interposed between the upper member and the spring-bar and bored or slotted for the insertion of clips m K', substantially as shown and described, and for the purpose set forth.

In testimony whereof I have signed this specification in the presence of two subscribing witnesses.

MARSHALL G. BENTLEY.

Witnesses:
J. H. STEARNS,
J. E. SWARTS.